No. 727,221. PATENTED MAY 5, 1903.
C. M. SMITH.
CURVED MOMENTUM GRAVITY TRACK.
APPLICATION FILED MAY 12, 1902.
NO MODEL.

Witnesses
B. W. Pierce
J. B. Martin

Inventor
Charles M. Smith
by James R. Rogers
Attorney

THE NORRIS PETERS CO., PHOTO-LITHO., WASHINGTON, D. C.

No. 727,221. Patented May 5, 1903.

UNITED STATES PATENT OFFICE.

CHARLES M. SMITH, OF LOS ANGELES, CALIFORNIA.

CURVED MOMENTUM GRAVITY-TRACK.

SPECIFICATION forming part of Letters Patent No. 727,221, dated May 5, 1903.

Application filed May 12, 1902. Serial No. 107,028. (No model.)

*To all whom it may concern:*

Be it known that I, CHARLES M. SMITH, a citizen of the United States, residing at Los Angeles, in the county of Los Angeles, State of California, have invented and discovered a new and useful Improvement in Curved Momentum Gravity-Tracks; and I do hereby declare the following to be a full, clear, and exact description of the invention, such as will enable others skilled in the art to which it appertains to make and use the same.

This invention relates to improvements in tracks for bicycles and other vehicles; and some of the objects of my improvement are, first, to provide a track on which vehicles travel; second, to produce a single track on which a bicycle is propelled with safety; third, to construct a single track in an apparently dangerous position on which a bicycle or other vehicle is run without peril to the rider; fourth, to make a single track on which a bicycle is operated, the starting-point of the track being higher than the finishing-point; fifth, to produce a single track for vehicles having a loop as a part thereof interposed between the two ends of the track; sixth, to devise a single track with a continuous-loop portion made integral therewith for the amusement of the public. I attain these and other objects by the construction illustrated in the accompanying drawings, in which—

Figure 1:
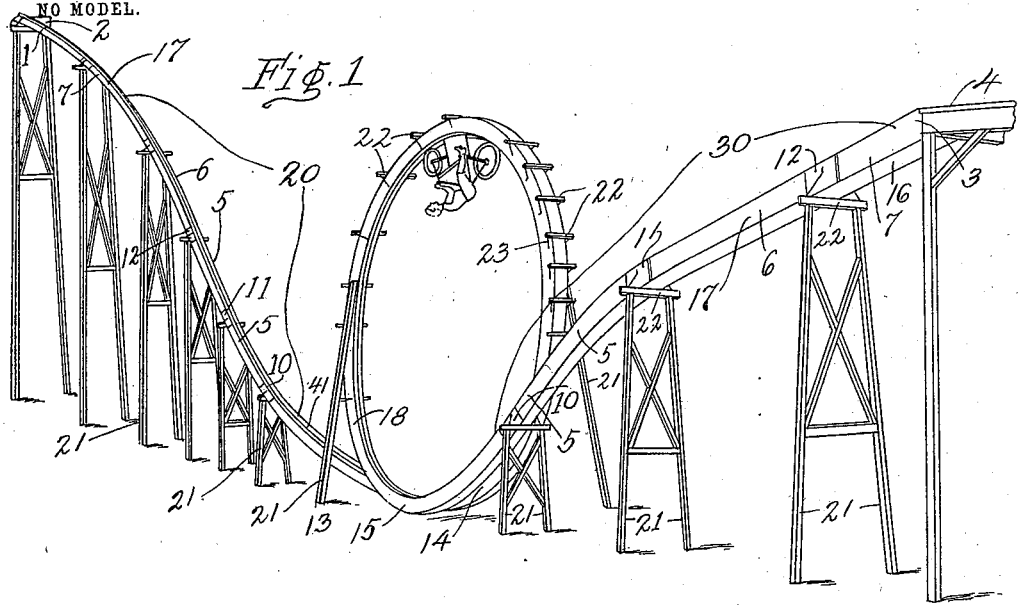
Figure 2:
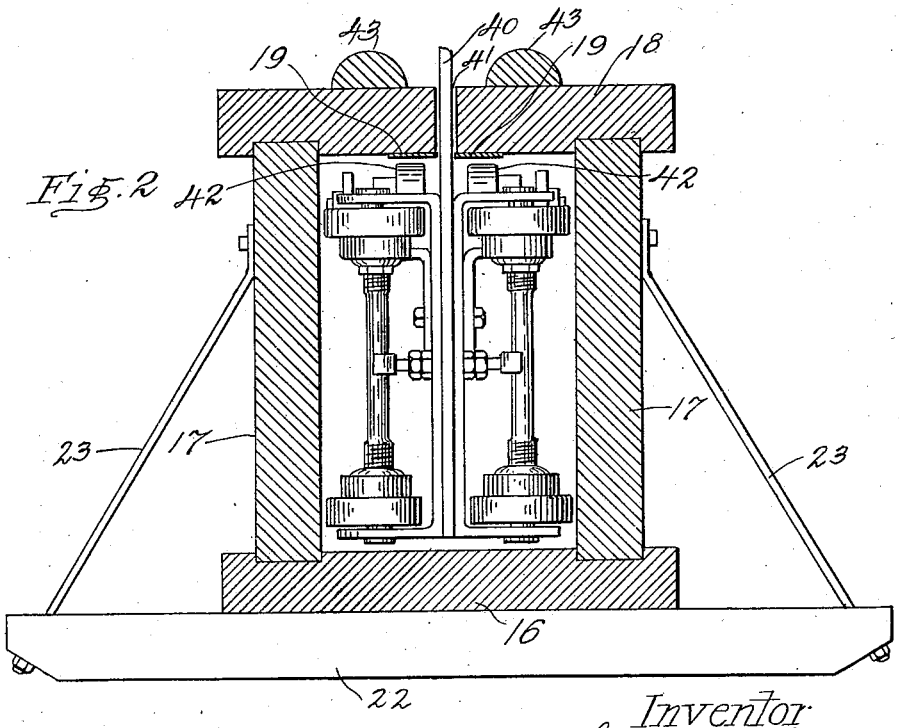

Figure 1 is a perspective view of the track and the loop forming a part thereof, and Fig. 2 is a view in elevation of the safety attachment for the vehicles within the track and showing a portion of the track in section.

Similar reference-numerals refer to like parts throughout both views.

The numeral 1 designates one end of the track, the starting-point thereof considerably higher than the other end thereof, and at or near the starting-point a platform 2 is erected for the convenience of the rider or riders in preparing for the journey over the track from the starting-point 1 to the finishing-point 3. At or near the finishing-point or end of the track another platform or station 4 is built for the accommodation of the operator or operators of the vehicle on which to sit down and be refreshed after the journey is ended. The entire track is made in sections, as indicated at 5, 6, and 7, upon the descending or starting portion of the track, and in like manner the track is constructed in sections, as referred to by the reference-numerals 5, 6, and 7, upon the ascending or finishing portion of the track. Each one of the said sections 5 5, 6 6, and 7 7 are made alike, and the end of one section abuts and adjoins the end of the adjacent section and are held together by cleats 10 11 12 upon the descending portion 20 and finishing portion 30 of the track, respectively, the said reference-numerals decreasing in denomination on the starting portion 20 of the track to the end 13 thereof, the beginning of the ascending loop portion 14, and the said reference-numerals increasing in denomination from the bottom or end of the loop 15 of the finishing or ascending portion 30 of the track. A description of one of the said sections 5, 6, or 7 will serve as descriptive of each and all of the said sections.

To the board 16 of any one of the sections is secured, upon the outer edges thereof and at right angles to the edges of said board throughout its entire length, the two side boards 17, both of said boards 17 being of the same dimension and securely fastened to the board 16 by means of screws or other suitable devices to prevent the said side boards 17 from spreading apart or separating from each other. The board 16 is grooved throughout its entire length near the two edges thereof, and the two said side boards 17 are inserted in said grooves of the board 16 and therein secured by screws or other suitable means. Thus it will appear obvious, so far as described, that there is a trough formed by the board 16 and the two boards 17, in which the steering apparatus, attached to the bicycle or like vehicle by means of the steel plate 40, is operated therein, as will hereinafter further be explained.

The trough comprising the board 16 and the two side boards or planks 17 for each section of the track has an addition made thereto. Upon the free edges of the said two side boards or planks 17 is fastened the cover 18, (shown upon Fig. 2 of the drawings,) consisting of a single board or plank 18 of the same dimension as the board 16, and the said cover 18 is secured to the free detached edges of the two side boards 17 in like manner as the opposite edges of said side boards 17 are fastened to the board 16, as before described. The cover 18 is slotted in each section of the track throughout its entire length, and in the slot 41 formed in said cover the steel plate 40, rigidly secured to the frame of the bicycle or other vehicle, is caused to travel freely therein as the vehicle is propelled by the rider over the track.

On the under side of the cover 18 and within the track, projecting slightly into the slot 41, are two protecting-strips 19, made of steel or other suitable material, against which the wheels 42, fastened to the steering apparatus and a part thereof, within the track, travel. The particular construction of the said steering apparatus (shown in Fig. 2 of the drawings) is made a subject-matter of a separate application for a patent, and therefore any further description of said steering apparatus is not necessary to be made herein.

Upon the outside of the cover 18, at short distances from the slot 41 on either side thereof and extending the entire length of the descending loop and ascending portions of the track, are two outer rounded surfaced beads 43. One surface of said beads is flat, which flat surface lies close to the outside of the cover 18, and the said beads are secured to the cover 18 by means of screws or other suitable devices. Between these two beads the wheels of the vehicle travel and by means of which, together with the plate 40, keep the vehicle plumb and true upon the track.

The track, composed of abutting sections, as hereinbefore described, is supported upon props 21, located at suitable points under the track, from one end to the other of the descending and ascending portions thereof, and the loop is retained in the true vertical position by means of two or more props 21, as may be required.

Throughout the entire length of the descending portion and the ascending portion of the track cleats 10, 11, and 12 are fastened on the outside of the boards or planks 17 on both sides of the track and extending over the abutting end of the two adjacent sections thereof and securely fastened to the said boards 17 by means of screws or other suitable devices. By means of said cleats the adjacent sections of the track are rigidly held together and kept in alinement with each other throughout the entire length of the track, including the descending and ascending portions thereof. Under each pair of these cleats 10, 11, and 12, holding together abutting and adjoining ends of two adjacent sections of the track, one prop 21 is placed, thereby rigidly holding in alinement different sections of the track in its true elevated position, and what might appear to be weak points of the track are in reality as strong as other portions thereof. The props that hold in position the loop are not required to be so numerous as in other portions of the track— only a sufficient number to keep the loop in the true vertical position.

To prevent the two side boards 17 composing the track from spreading apart, I provide brackets composed of strips 22 of wood or other suitable material, each strip 22 longer than the width of the board 16 and of the cover 18, and these strips are secured at short distances apart on the outside of the board 16 by means of screws or other devices, said strips 22 projecting on either side and beyond the track, and to each end of said strips 22 is fastened a bracket-iron 23, as shown upon the loop portion of the track in Fig. 1 of the drawings. The opposite end of the bracket-iron 23 is secured, by means of screws or other suitable means to the side boards 17, near the edge thereof, where the cover 18 is fitted to the edge of said boards.

Having described my invention, what I claim, and desire to secure by Letters Patent, is—

1. In amusement-railways, a single track including therein a vertical loop having a longitudinal slot therein, in which a guide-plate secured to a vehicle is adapted to slide and over which slot the wheels of the vehicle are constructed to travel.

2. In an amusement-railway, a single track including therein a vertical loop provided with a central longitudinal slot, in which a steering device attached to a vehicle is constructed to move, and over which slot one of the wheels of a vehicle is adapted to travel.

3. In amusement-railways, a single track comprising a descending portion, a loop portion, and an ascending portion, said portions having a longitudinal slot therein, means secured to a vehicle adapted to travel in said slot.

4. In railways, a single track composed of a descending portion, a vertical loop portion, and an ascending portion, having a central longitudinal slot therein, in which a plate secured to a vehicle is adapted to travel, and over which slot the wheels of said vehicle are constructed to move.

5. In railways, a single track, having connected descending, loop and ascending portions each of which portions is provided with a central longitudinal continuous slot in which a guide-plate, attached to a vehicle, is constructed to slide and over said slot the wheels of said vehicle are adapted to travel.

6. In railways, a track comprising a descending, and ascending and vertical loop portions, the radii of said loop being equal, each of said portions of the track provided with a central longitudinal slot, means secured to a vehicle, adapted to slide in said slot and guided thereby.

7. In amusement-railways, a single track centrally and longitudinally slotted throughout the entire length thereof, said track having interposed, intermediate of the ends thereof, one or more vertical loops, whose radii are equal, a guide-plate secured to a vehicle, adapted to travel within said slotted track.

8. A single track having a central longitudinal slot therein, said track comprising a descending, loop and ascending portion, continuously slotted throughout the entire lengths thereof, means attached to a bicycle constructed to slide in said slot, and over which slot the wheels of the bicycle are adapted to travel.

9. A single track for a bicycle, consisting of three or more portions, a descending, loop and an ascending portion, each of said portions provided with a central longitudinal connected slot throughout the entire lengths of said portions, a guide-plate secured to a bicycle constructed to slide within said slot, and the wheels of the bicycle adapted to travel in a path over said slot.

10. A single railway-track having a vertical loop a part thereof, the radii of which loop are all equal, said track provided with a single slot adapted to receive the steering apparatus of a bicycle or other vehicle.

11. A single track for bicycles or other vehicles, provided with a slot in the cover thereof, adapted to receive a steering apparatus, said track made in sections, each of which consists of three boards and a cover forming a rectangular box, each section rigidly secured to the adjoining and abutting section or sections, means for supporting said sections of the track, and the said cover of each section longitudinally slotted to receive the steering apparatus within the sections of the track secured to a bicycle or other vehicle adapted to travel over the track.

In testimony whereof I have signed my name to this specification in the presence of two subscribing witnesses.

CHARLES M. SMITH.

Witnesses:
AMELIA GUEST,
I. B. MARLIN.